73-655 SR

2/4/86 XR 4,568,414

United States Patent [19]

Oldis et al.

[11] Patent Number: 4,568,414

[45] Date of Patent: Feb. 4, 1986

[54] METHODS AND APPARATUS FOR TENSIONING SHEET MATERIAL

[75] Inventors: John E. Oldis, Belews Creek, N.C.; Clayton L. Nicholas, Indianapolis, Ind.

[73] Assignee: AT&T Technologies, Inc., Berkeley Heights, N.J.

[21] Appl. No.: 653,120

[22] Filed: Sep. 21, 1984

[51] Int. Cl.[4] ........................ B32B 31/20; G01L 5/10; H04R 19/01

[52] U.S. Cl. ........................................ 156/64; 73/529; 73/655; 73/778; 73/862.41; 73/DIG. 1; 156/73.6; 156/160; 156/229; 156/378; 156/494; 156/556; 156/580; 179/111 E

[58] Field of Search ................ 156/64, 73.6, 160, 163, 156/229, 378, 494, 556, 580; 179/111 E; 73/579, 655, 778, 862.41, DIG. 1

[56] References Cited

U.S. PATENT DOCUMENTS

| | | | |
|---|---|---|---|
| 2,792,707 | 5/1957 | Anderson | 73/785 |
| 2,853,146 | 9/1958 | Coates | 181/148 |
| 3,093,760 | 6/1963 | Tarasevich | 73/778 |
| 3,394,487 | 7/1968 | Freeman | 43/61 |
| 3,434,181 | 3/1969 | Benzies | 156/160 |
| 3,942,369 | 3/1976 | Roggenstein et al. | 73/862.41 |
| 4,042,438 | 8/1977 | Kawakami et al. | 179/111 E |
| 4,109,520 | 8/1978 | Eriksson | 73/862.41 |
| 4,158,962 | 6/1979 | Conoval | 73/862.41 |
| 4,249,043 | 2/1981 | Morgan et al. | 179/111 E |
| 4,277,973 | 7/1981 | Hawkes | 73/862.41 |

*Primary Examiner*—Michael Wityshyn
*Attorney, Agent, or Firm*—R. F. Kip, Jr.

[57] ABSTRACT

An electret sheet is clamped on an apertured support around the aperture so that a sheet portion stretches all across the aperture. A tension-producing ring is advanced against the sheet portion normal to its stretch direction to produce progressively increasing tension therein. Concurrently, a loudspeaker on one side of the sheet emits constant-amplitude sound waves of fixed frequency and directed against the sheet portion to cause it to vibrate at that frequency. When, because of the increasing tension in the sheet portion, it's vibration amplitude rises to a predetermined value at or near resonance, the advance of the mentioned ring is ended, and the sheet portion is adhered to another ring which retains in that portion the tension then existing in it. Such tensioned sheet and adhering ring are then used to make electret diaphragms for electret microphones.

21 Claims, 4 Drawing Figures

METHODS AND APPARATUS FOR TENSIONING SHEET MATERIAL

FIELD OF INVENTION

This invention relates generally to methods and apparatus for tensioning sheet material and, more particularly, to methods and apparatus of such kind adapted to impart to a piece of electret sheet material a tensile stress which is isotropic in the length and width dimensions of the piece, and which is fixedly retained as discrete portions of that piece are converted into diaphragms used in electret transducers such as electret microphones.

BACKGROUND OF THE INVENTION

A copending U.S. patent application, Ser. No. 469,489 filed Feb. 24, 1983 in the name of Paulus et al for "Electret Microphone", and assigned to the assignee hereof and incorporated herein by reference, discloses an electret microphone comprising a metallic disc-shaped back electrode, an annular spacer washer extending in secured relation around the circumference of one surface thereof, and a circular electret diaphragm bonded around its circumferential border to the side of the washer away from the back electrode so that the diaphragm is maintained in spaced relation therefrom by the washer. The mentioned diaphragm is constructed of electret sheet material comprising a dielectrically-polarized radially-tensioned polymer film having a thin metal layer on its surface away from the washer. The polarization of the film creates between such layer and the back electrode an electric field which, when sound waves fall on the diaphragm, is modulated to produce between the metal layer and back electrode a varying voltage adapted to be transmitted from the microphone as an electrical signal representative of those sound waves.

In the course of manufacture of microphones of the sort described, their diaphragms are caused to be radially tensioned in a manner as follows: An electret sheet much larger than the diaphragms is secured by adhesive to the bottom of an annular holding disc so that the sheet stretches over the circular opening of the disc. The holding disc is placed over, and in coaxial relation with, an annular support disc having a smaller circular opening than the holding disc. The support disc bears on it a toroidal tensioning ring surrounding and concentric with that disc's opening and forming an annular upward projection on top of the support disc. To tension the electret sheet, the disc which holds it is moved down to press down on the support disc and, to cause the tensioning ring on the latter disc to (a) first contact a ring-shaped area of the sheet within the central opening of the holding disc and, then, (b) to press up against the sheet to upwardly displace (relative to the holding disc) a central sheet portion within such ring-shaped area. The sheet thereby is radially tensioned so that such central sheet portion is stretched across the tensioning ring. While that sheet portion remains so tensioned, a numerous plurality of the mentioned electret microphone washers are each bonded by adhesive to the tensioned central sheet portion so as, by the bonding, to fixedly retain in the part of the electret sheet extending across the washer opening the tensile stress than existing in the larger central electret sheet portion extending across the tensioning ring opening. Thereafter, the electret sheet is cut away around each washer to leave behind only that washer and the tensioned sheet material which is bonded to and extends across that washer, and which tensioned sheet material forms the diaphragm for the earlier described electret microphone.

In providing tensioned electret diaphragms by such method, it is not possible to selectively control during tensioning of the electrer sheet the amount of tension imparted to the electret sheet and later fixedly retained in the diaphragms made therefrom. The result is that the tension in the diaphragms may vary from one made batch thereof to another because of variation in the modulus of elasticity or other characteristic(s) of the electret sheets used in making successive batches of diaphragms. Such possible variation in diaphragm tension creates a problem, however, in that the diaphragm resonant frequency (which varies as a function of the diaphragm tension) is likewise not selectively controllable and, accordingly, may vary among various batches of diaphragms, but it is preferable that all diaphragms have the same resonant frequency.

SUMMARY OF THE INVENTION

In contrast to the foregoing, in methods and apparatus according to the invention for tensioning sheet material, the frequency of mechanical resonance of the tensioned material may be selectively controlled in a manner as follows. Concurrently with the tensioning of the material by a changing force to produce therein a correspondingly changing tensile stress isotropic in the length and width dimensions of the material, there is imparted to the material a vibration independent in frequency of the amount of such stress and having a parameter which varies as a function of such changing stress and which can, but need not, be the amplitude of vibration. That parameter is monitored as such force and tensile stress change to determine when, as a result of such change, the parameter reaches some value which may be, for example but without limitation, the point at which the amplitude of the said vibration reaches a condition of resonant vibration. Thereupon, there is terminated further change in such force while continuing its application to retain in the tensioned material the then existing tensile stress therein. Because the mentioned vibration parameter is monitored in the course of treating the material as described, it is possible to selectively control, for example but without limitation, the mechanical resonant frequency of the tensioned material obtained so that uniformity in such frequency can be achieved despite variation among various successively used pieces of sheet material in one or more characteristic thereof affecting such frequency. While methods and apparatus according to the invention are particularly useful to the end of providing electret transducer diaphragms having a uniform mechanical resonance frequency, such methods and apparatus may well also be useful in other applications.

BRIEF DESCRIPTION OF DRAWINGS

For a better understanding of the invention, reference is made to the following descriptions of an exemplary embodiment thereof, and to the accompanying drawings wherein.

DESCRIPTION OF THE APPARATUS

Figure 1:
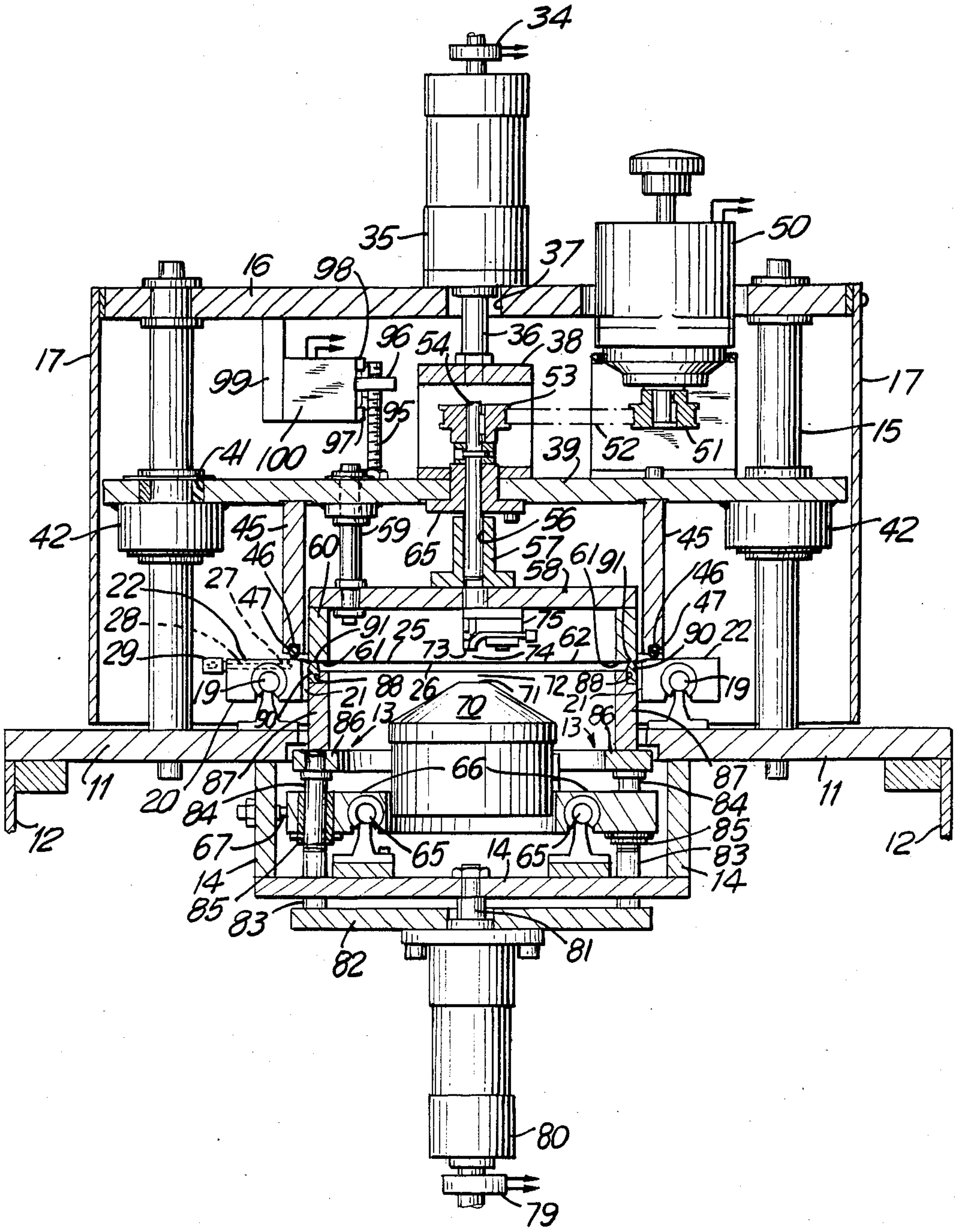
FIG. 1 is a front elevation of an exemplary machine for tensioning electret sheets according to the invention.

Referring now to FIG. 1, the reference numeral 10 designates an electret sheet tensioning machine comprising a horizontal main table 11 supported above a floor or other foundation by side plates 12 (shown broken away) at its longitudinally opposite ends. Table 11 has a large central aperture 13 therein. Bolted to he underside of table 11 is a subframe 14 disposed beneath aperture 13. Equiangularly distributed around such aperture are four support posts 15 providing at their top a mounting for a top plate 16 held by the posts in spaced relation above table 11. The upper part of machine 10 is enclosed by a cover 17 attached to the sides of top plate 16.

Table 11 supports on longitudinally opposite sides of aperture 13 a pair of laterally running rails 19 mounting a slide table 20 movable on rails 19 in the lateral dimension (i.e., normal to the plane of the FIG. 1 drawing) and in the inward direction (i.e., towards such plane) from an outer position to an inner position at which further table movement is arrested by stop means (not shown). Table 20 has formed therein a central aperture 21 which passes vertically therethrough, and which aperture 21 is over aperture 13 in main table 11 when slide table 20 is stopped at its inner position. Aperture 21 preferably is but need not be of circular shape.

The top of slide table 20 comprises a bearing surface 22 surrounding the recess formed in such top by aperture 21. The table 20 provides a support means for an electret sheet positionable on surface 22 (with the metallized layer of the sheet facing up) so that a first portion 26 of sheet 25 extends across aperture 21, and so that portion 26 is bordered around its entire circumference by sheet material resting on bearing surface 22. Initially, sheet 25 is drawn to that surface by vacuum produced in an annular groove 27 which is formed in surface 22 to extend around aperture 21 and which is connected by a passage 28 in table 11 to a vacuum port 29 in turn connectable to a source of vacuum (not shown).

To the end of more firmly clamping sheet 25 to bearing surface 22, machine 10 includes a vertical air cylinder 35 mounted on the upper side of top plate 16 and having a piston 36. Up and down movement of piston 36 may be controlled by an electrically actuated solenoid valve 34 interposed at the inlet to cylinder 35 between it and its air supply. Piston 36 extends down through an aperture 37 in plate 16 and is fastened at its lower end to the top of a hollow bracket 38 of which the bottom is fixedly secured to a vertically movable clamping platen 39. Platen 39 has formed in its periphery four vertical apertures 41 (only one shown) in which are received four respective bushings 42 in which, in turn, are slidably received the four vertical posts 15 serving to guide platen 39 in its vertical movement. Secured to the underside of platen 39 is a downstanding cylindrical clamping sleeve 45 of which the annular front end registers in spaced relation with bearing surface 22. Sleeve 45 has formed in its front face an instanding annular groove 46 in which is seated on "O" ring 47 of which the lower third projects outwardly downward from sleeve 45. When air cylinder 35 is actuated to move elements 36, 38, 39, 45 and 47 downward together, "O" ring 47 is driven towards bearing surface 22 to squeeze between elements 47 and 22 the sheet material surrounding sheet portion 26. In this way, the sheet material at the circumferential margin of such portion is firmly gripped to preclude radial inward slippage of such material towards the center of aperture 21 when, as will now be described, sheet portion 26 is tensioned.

For tensioning that sheet portion, machine 10 includes an electric motor 50 secured in a socket therefor in top plate 16 so that the front end of the motor is disposed below that plate. Motor 50 has mounted on its shaft a pulley 51 connected by an endless drive belt 52 to another pulley 53 disposed in the space within bracket 38. Pulley 53 is a slidably keyed to the top of a lead screw 54 passing down slidably through a smooth bore in a guide bushing 55 inset in clamping platen 39 and, beyond that bushing, down into a threaded bore 56 formed in a nut 57 fastened to the top of a vertically movable tensioning platen 58 guided in its vertical movements by three guide rods 59 (only one shown) upstanding from platen 58 and passing with a slide fit through corresponding vertical bores formed in clamping platen 39. Tensioning platen 58 has secured to its underside a circular tension-producing ring 60 concentric with the aperture 21 in slide table 20 and of smaller diameter than that aperture. Upon being advanced downward, ring 60 is adapted to first contact and then press against a ring shaped area 61 of held electret sheet 25, which are is within a first portion 26 of that sheet and, moreover, surrounds a second sheet portion 62 included within portion 26. As will be later described in more detail, such pressing of ring 60 against electret sheet 25 is adapted to tension a part of that sheet including sheet portion 62.

For purposes of vibrating sheet portion 62, subframe 14 mounts below that sheet portion a pair of longitudinally-spaced laterally extending slide rails 65 in turn mounting a slide table 66 laterally movable on the rails from an outward position to an inward position at which table movement is stopped by detent mechanism 67. Slide table 66 mounts in a top socket therein an electroacoustic transducer means in the form of a sound wave generator 70 which, when table 66 is at its inner position, is disposed concentrically with and directly below sheet portion 62 such that the front end 71 of the generator is spaced by only a small air gap 72 from the underside of that sheet portion. Sound generator 70 may conveniently be a Bruel and Kjaer Model No. 4219 "Artificial Voice" loudspeaker.

Vibrations produced in sheet portion 62 are sensed by the probe 73 of an optoelectric sensor means 75 fixedly attached to the underside of platen 58 so that probe 73 is concentric with and disposed above sheet portion 62 to be separated therefrom by a gap 74. Sensor 75 may conveniently be a Photonic Sensor, Model No. MTI-1000. In this type of optoelectric device, light from optical fibers in the device is projected downward across gap 74 to impinge on the metal layer of sheet portion 62, and to then be reflected back up and detected by photoelectric means in the device. Vibration of sheet portion 62 causes the reflected light to be intensity modulated as a function of the amplitude of vibration, and that light modulation causes the mentioned photoelectric means to generate a voltage signal of a frequency and amplitude corresponding to, respectively, the frequency and amplitude of the vibration being undergone by sheet portion 62.

In order that, after sheet portion 62 has been tensioned to the extent desired, it may be removed from machine 10, beneath subframe 14 in spaced relation therefrom is a vertical air cylinder 80 of which the top of its piston 81 is bolted to the bottom of the subframe so that, upon actuation of the air cylinder, the cylinder 80 itself will move up or down, as the case may be, in relation to the subframe. Up and down movement of cylinder 80 is controlled by an electrically actuated solenoid valve connected between the air inlet for the cylinder and its air supply. Cylinder 80 has secured to its top a horizontal platen 82 upstanding from which are four vertical displacing rods 83 (only two shown) slidably passing upward through vertical bores in subframe 14 so that the front ends of those rods are above that frame. Slide table 66 carries four matching upper vertical displacing rods 84 slidably received in bushings 85 inset into the slide table, rods 84 being horizontally positioned so that, when table 66 is at its inner position, rods 84 are disposed directly above, and are aligned with, and rest on, rods 83. The tops of rods 84 are secured to an annular support disc 86 surrounding in spaced relation the sound generator 70. Disc 86 mounts on its upper side a circular ring-carrying sleeve 87 of which the upper annular end has formed therein a "L" shaped groove 88 including that end and facing outwardly and upwardly. Groove 87 is shown as having detachably seated therein a tension-retaining ring or hoop 90 having a flat annular top 91 disposed above sleeve 86 and coated with adhesive. Hoop 90 is adapted to be ujsed to remove the tensioned sheet portion 62 from machine 10 in a manner to be later described in more detail.

Upstanding from clamping platen 39 is a post 95 carrying near its top a horizontal trip lever 96 of which the left hand end is adapted to move vertically in a path extending between lower and upper limit contacts 97 and 98 of a microswitch 100 attached by lug plate 99 to the underside of top plate 16. Microswitch 100 is incorporated in an electrical control system which is used to sequence the operations of machine 10, and which will now be described.

Figure 2:
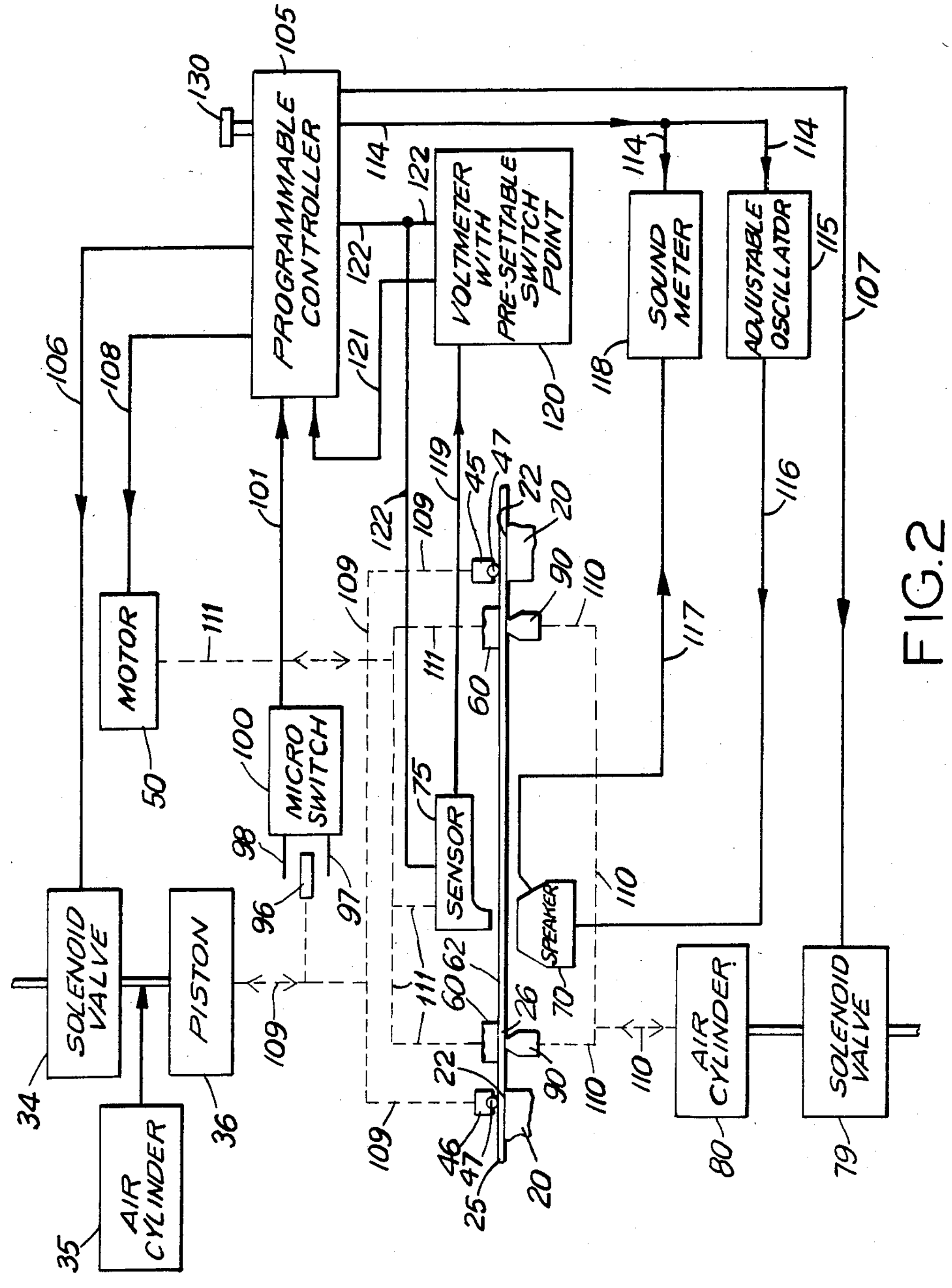
FIG. 2 is a block diagram of an electrical control system for the FIG. 1 machine.

Referring now to FIG. 2 which shows such control system, microswitch 100 is adapted to provide over line 101 an electric control input to a programmable controller 105 which may be Model No. 510-1101 controller manufactured by the Texas Instruments Company. Controller 105 is adapted to provide electrical control outputs over lines 106, 107, 108 to, respectively, solenoid valve 34, solenoid valve 79, and motor 50. As earlier described, valves 34 and 79 are adapted to control, respectively, the movements of piston 36 and air cylinder 80, and the movements of such pistons and cylinders are transmitted to, respectively, the combination of clamping sleeve 45 and "O" ring 47, and to tension-retaining hoop 90, through respective mechanical couplings which are designated 109, 110 in FIG. 2, and the nature of which will be evident from the previous description of machine 10. Motor 50 when actuated is adapted to produce linear vertical movement of tension-producing ring 60 by way of a machanical coupling of the motor and ring which is designated 111 in FIG. 2, and the nature of which will also be evident from the previous description of machine 10.

Controller 105 is also adapted to turn on and off via electrical line 114 an oscillator 115 adapted to supply via line 116 an electrical sine wave output to loudspeaker 70 to energize it to produce corresponding-sound waves impinging on electret sheet portion 62. Oscillator 115 may be a Wavetek, Model No. 182A function generator, and oscillator 115 is adapted to have its sine wave output manually set to various amplitudes and frequencies which, however, remain constant in value until reset. It follows that the amplitude and frequency of the vibratory energy output from speaker 70 can likewise be each set to various selected values but, when once set to a particular value, will remain constant thereat until reset.

For purposes of monitoring the sound wave output from speaker 70, disposed inside its housing adjacent to sound-producing diaphragms is a small sound pick-up microphone (not shown) connected via electric line 117 to a sound meter 118 adapted to provide a visual indication of the amplitude level of such waves. Device 118 may be, for example, a Bruel or Kjaer, Model No. 2609, Measuring Amplifier, and the device may be turned on and off by controller 105 via line 114.

As mentioned, microswitch 100 provides a control input to controller 105. To the end of providing another control input thereto vibration sensor 75 is connected via line 119 to a voltmeter device 120 which responds to the voltage signal from sensor 75 to provide a running measure of the amplitude of that signal and, which, moreover, has a switch point settable over a range of values to any preselected value in that range so that when, the signal amplitude reaches that preselected value, device 120 produces on an electrical line 121 an output fed by that line to unit 105 as a control input to that unit. Elements 75 and 120 may each be turned on and off by controller 105 via a line 122. Device 120 may be, for example, an LFE Digital Voltmeter/Switch, Model No. 4424-K. Since the amplitude of the signal output to device 120 corresponds, as described, to the amplitude of vibration of electret sheet portion 62, the development by device 120 on line 121 of a "trigger" input to controller 105 is an action which signals that such vibration amplitude has reached a preselected value therefor.

OPERATION AND METHODS

The apparatus of FIGS. 1 and 2 is operated in a manner as follows. Prior to a sheet tensioning operation, such apparatus is in a quiescent condition in which (a) slide table 20 (FIG. 1) is in its outer position and has no electret sheet thereon, (b) slide table 66 is in outer position, and the sleeve 87 carried by that table has no tension-retaining hoop 90 seated on the front end of the sleeve, (c) piston 36 is in up "home" position (d) cylinder 80 is in down "home" position, (e) motor 50 is "off" but has previously been run reversely to act through coupling 109 to lift tension-producing ring 60 to an up position above the level of the bearing surface 22 of slide table 20, and (f) elements 70, 115, 118, 75 and 120 are all in "off" condition.

The preliminaries to a tensioning operation are as follows. While slide table 20 is in outer piston, the machine operator loads onto it an electret sheet 25 so that it covers aperture 21 in the table. Vacuum is applied in groove 27 to hold the sheet on the table. Table 20 is then slid to its inward position and there stopped.

Next, while slide table 66 is in its outer position, the operator (a) seats a tension-retaining hoop 90 in groove 88 of ring-carrying sleeve 87, (b) applies adhesive to the flat top 91 of hoop 90, (c) slides table 66 inwardly until its movement is stopped by detent mechanism 67.

The apparatus is now ready for a sheet tensioning cycle. To initiate such cycle, the operator presses a "start" button 130 on controller 105 which responsively controls valve 34 to actuate air cylinder 35 to move its piston 36 downward to cause "O" ring 47 to press down on sheet 25 so that it is squeezed between the ring and bearing surface 22 of table 20 all around the circumference of aperture 21 in the table.

Concurrently with the actuation of air cylinder 35, controller 105 turns "on" oscillator 115, sound meter 118, sensor 75 and voltmeter/switch 120.

At the end of the downward movement of piston 36, tripping lever 96 engages lower limit contact 97 of microswitch 100 to cause production thereby of a signal fed to controller 105 which responds by energizing motor 50 to effect a slow downward advance of tension-producing ring 60. As ring 60 so advances, it contacts a ring shaped area within the electret sheet portion 26 which extends across aperture 21 and is clamped around the circumference of that aperture. Then, as the advance of ring 60 continues, the ring presses against that area to downwardly displace relative to bearing surface 22 the electret sheet portion 62 included with sheet portion 26 and circumferentially bounded by such area. In effecting such downward displacement, ring 60 acts on electret sheet 25 with a force which is changing in the sense that it is progressively increasing from zero. Because sheet portion 26 is surrounded by sheet material which is gripped so that it can't move radially inward, the application of that progressively increasing force on sheet 25 produces an elastic stretching of the material constituting sheet portion 26 and such elastic stretching in turn produces a radial tensioning of that material in the sense that a tensioning force is exerted on sheet portion 26 in all radial directions away from the center of that portion. The tensioning in such manner of sheet portion 26 develops in the material of sheet portion 62 a tensile stress which may be described as being radial but which may also be characterized as being isotropic in the length and width dimensions of such sheet portion. That is, the tensile stress in sheet portion 62 is the same as if that sheet portion were to be square with edges aligned in X and Y orthogonal coordinates and, further, were to be subjected to equal tensioning force in these two coordinates. The mentioned tensile stress developed in sheet portion 62 is, of course, a stress which changes in correspondence with the mentioned changing force exerted by ring 60 so as to progressively increase from zero.

It will be recalled that, with commencement of the advance of ring 60, oscillator 115 was turned "on". The turning on of the oscillator drives speaker 70 to produce vibratory energy in the form of sound waves constant in amplitude and frequency and impinging on sheet portion 62 to set it into up-down vibration at a constant frequency corresponding to that of the exciting sound waves. The frequency of vibration of sheet portion 62 is determined by the frequency value set on oscillator 145, and that frequency value is selected in a manner later described in more detail but which, in any event, is substantially higher than the natural mechanical resonance frequency of sheet portion 62 during the initial part of the increasing of the tensile stress in that sheet portion.

The resonant frequency of sheet portion 62 is a function of several factors including its dimensions and mass and the tensile stress therein. In the operation being described, the dimensions and mass of the sheet portion remains constant. Accordingly its natural resonant frequency varies directly with the square root of the tensile stress therein.

From the considerations just adduced, it will be evident that, as the tensile stress in sheet portion 62 is progressively increased and, concurrently, the sheet portion is vibrated at a fixed frequency, the vibration of the sheet will initially be a non-resonant vibration, and the amplitude of such vibration will be essentially flat per unit increase in tensile stress. With, however, progressive increase in such stress to the point where the natural resonant frequency of sheet portion 62 is caused to approach the value of the fixed frequency at which sheet portion is being forced to vibrate by the sound waves impinging thereon, the amplitude of vibration of the sheet portion will reach a knee in its curve at which such amplitude will rise per unit increase of tensile stress at a relatively fast rate until, just before the peak of resonance is reached, the amplitude curve starts to level off and, at the peak, has a rate of zero (thus following the typical resonance curve of a resonant system). That is, there is a time at which the progressive increase in the tensile stress in sheet portion 62 causes its forced fixed frequency vibration to change from a non-resonant vibration to a resonant vibration of the sheet portion, the change-over point being indicated by a rapid increase in the amplitude of vibration of the sheet portion.

Such rising amplitude is monitored by devices 75 and 120. Note, in this connection that, as tension-producing ring 60 is moved downward by coupling 109, sensor 75 is moved down by such coupling in the same amount so that there is no change in size in the gap 74 between sensor 75 and sheet portion 62. In this way, there is no variation in such gap size which would affect the voltage signal which is fed from sensor 75 to voltmeter switch 120 and which is a running measure of the amplitude of vibration of sheet portion 62.

As such increasing amplitude of vibration passes the knee of its curve, the amplitude rise causes the magnitude of the mentioned voltage signal to reach the switch point set on device 120. The manner of selecting the value to be set for such switch point will be later described in more detail. Suffice it to say for now that the switch point is set at such value that, when that point is reached, the natural resonant frequency of vibration of sheet portion 62 will, to an approximation, be the same as the frequency of the sound waves from speaker 70 which causes the forced vibration of sheet portion 62.

When the magnitude of the voltage signal on line 119 reaches the switch point set on voltmeter/switch 120, that device produces a "trigger" or "switch" signal fed by line 121 to controller 105. The controller responds by (a) deenergizing motor 50 to stop further advance of ring 60 and thereby terminate further change in the tension-producing force exerted by that ring on sheet portion 26, (b) turning off oscillator 115 and sound meter 118 to thereby end the generation of sound waves by speaker 70 and the vibration of sheet portion 62 caused by these waves, (c) actuating solenoid valve 79 to produce in air cylinder 80 an upward advance bringing the tension-retaining ring 90 up and into contact with the underside of sheet portion 62 so that the adhesive-coated top 91 of the ring adheres to such underside.

Once that adhering has been effected a first timing means (not shown) within controller 105 maintains cylinder 80 and ring 90 in up position for a period of, say, two minutes until the adhesive has set. When that condition of the adhesive is reached, tension-retaining ring 90 will fixedly retain within the part of sheet portion 62 circumscribed by the adhesive bonding of the ring to that sheet portion the tensile stress existing in sheet portion as of the time the advance of ring 60 was discontinued to terminate further increase in the tension-producing force exerted thereby.

At the end of the period allotted for the setting of the adhesive on ring 90 to produce a non-slippable bond between it and sheet portion 62, controller 105 is actuated to (a) energize solenoid valve 70 to move air cylinder 90 back down to home position so that sleeve 87 (FIG. 1) and ring 90 separate, with the ring remaining adhered to sheet portion 62, while the sleeve follows the air cylinder, (b) energize solenoid valve to move air piston 36 up to retract clamping ring 45 from sheet portion 26, the upward movement of elements 36 and 60 being ended by the coming into contact of trip lever 98 with upper limit switch 98 of microswitch 100 to cause the latter to produce on line 101 a signal fed to controller 205 and to which it responds to terminate that movement. Concurrently with the start of the actions discussed in the preceeding sentence, controller 105 starts a second timing means (not shown) which is included therein and, under the control of which, motor 50 is energized to rotate reversely for the same time period as it rotated forwardly in the course of producing advancement of ring 60 (the time interval elapsing from beginning to end of such forward advance of ring 60 being "remembered" by memory means (not shown) included in controller 105). When, as determined by such second timing means, the period for reverse rotation of motor 50 has reached its end, the motor 50 is deenergized by controller 105, with the tension-producing ring 60 thereby being restored to home position.

As subsequent steps, the operator of machine 10 returns slide tables 20 and 66 to outer position, discontinues the vacuum attracting the electret sheet 25 to bearing surface 22, and then removes from slide table 20 the mentioned electret sheet having hoop 90 adhesively bonded thereto. Machine 10 is now restored to its quiescent condition at which it is ready to undergo a new cycle of operation.

The removed sheet 25 and hoop 90 is utilized to manufacture electret microphone diaphragms in the manner which is disclosed in the aforementioned Paulus et al application and which has been earlier summarized herein, there being the difference however that such manufacture can be conducted at a location away from machine 10 whereas, in the Paulus et al manufacture, the tension-producing ring must be kept in contact with the electret sheet during manufacture of the diaphragms. Since successive electret sheets are tensioned by machine 10 such that their respective parts within tension-retaining rings 90 all are resonant at the same fixed frequency, i.e., approximately the frequency set on oscillator 115 and constituting the frequency of the sound waves driving those successive sheets to vibrate at the sound wave frequency, the electret microphone diaphragms made from those successive electret sheets will, in turn, all be resonant at the same frequency irrespective of variations occurring among those sheets in their mass, thickness, modulus of elasticity or in the tensile stress retained therein within ring 90. Indeed, the specific value of that stress is not significant and need not even be known.

Figure 3:
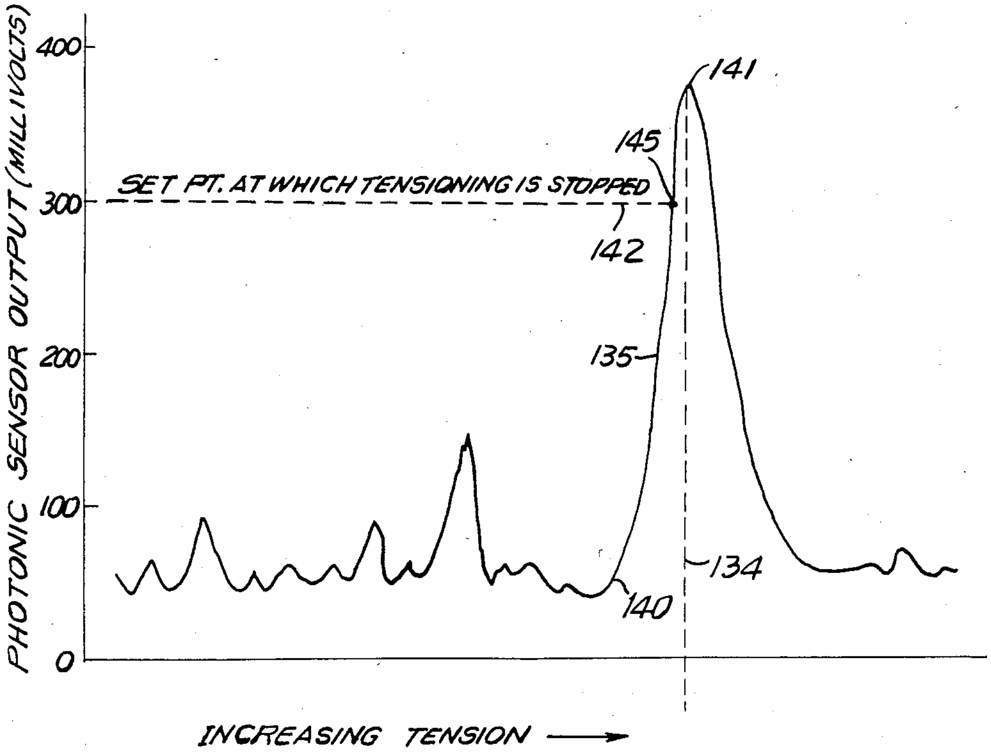
FIG. 3 is a graph relating to the operation of the FIG. 1 machine and illustrative of an exemplary relationship between the tensioning imparted to an electret sheet and its amplitude and vibration when vibrated at constant frequency.
Figure 4:
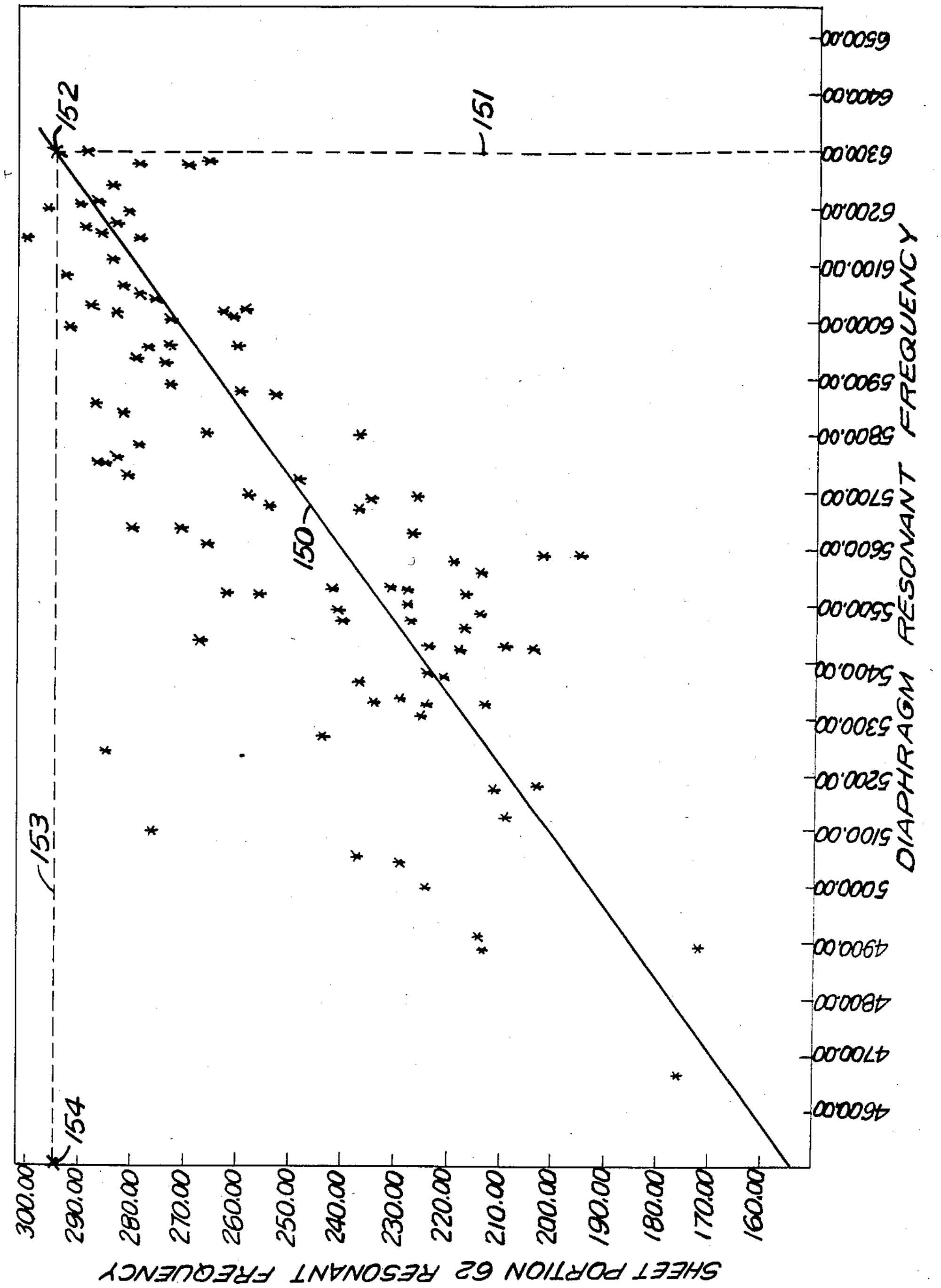
FIG. 4 is another graph showing the correlation between the mechanical resonant frequency of electret sheets tensioned by the FIG. 1 machine and the mechanical resonant frequency of electret microphone diaphragms formed from such tensioned sheets.

Further appreciation of the methods characterizing the above-described operation of machine 10 will be derived from a study of FIGS. 3 and 4. Referring first to FIG. 3, what is shown thereby in a graph of a curve 135 of amplitude as a function of increasing tension, which (curve) was obtained in the course of the tensioning by machine 10 of a particular electret sheet 25 when that sheet was excited into vibration by sound waves having a preselected constant amplitude value or level and a constant frequency of 330 cps, such fixed frequency being indicated by dash line 134. In the graph, displacement rightward in the horizontal coordinate from the origin point represents both increasing tensile stress in sheet portion 26 and an accompanying increasing natural frequency of resonance of the sheet portion 62 being driven in forced vibration by the sound waves from speaker 70. Upward displacement in the vertical ordinate represents increasing value in millivolts of the voltage signal which is fed from sensor 75 to voltmeter switch 120 and which, as stated, is a running measure of the amplitude of vibration of sheet portion 62. As shown by the graph, as the tensile stress initially increases, there are several minor amplitude peaks in such vibration, but over the first part of the increase in tensile stress, the trend of the curve is essentially flat. When, however, the natural resonant frequency of vibration of sheet portion 62 approaches fairly near to the fixed frequency of 330 cps at which it is being driven, the curve 135 has a knee 140, and further increase in tensile stress causes the amplitude of vibration of such sheet portion (and the corresponding magnitude of the voltage signal to device 120) to rise sharply and to then crest at an amplitude peak 141 which corresponds in the horizontal ordinate to the fixed frequency of 330 cps at which the sheet portion is being vibrated by the sound waves. Before, however, the mentioned voltage signal reaches that peak, its' magnitude attains a level 142 which is the switch point pre-set on voltmeter/switch 120. When such magnitude attains level 142, device 120 produces, as earlier described, a switch signal set to controller 105 to terminate further increase in tensile stress. In other words the tensile stress in sheet portion 62 will be built up to the point where the natural resonant frequency of the portion has the value corresponding in the horizontal ordinate to the rightward displacement from the origin of the point 145 defined by the intersection of level 142 with amplitude curve 135. It has been found by experiment on machine 10 that, with the switch point 145 being at a level 142 which, as shown in FIG. 3, is about 80% of the peak magnitude 141 attained by the voltage signal to device 120, the natural frequency of vibration of sheet portion 62 when the switch point is reached by that signal (and further increase in tensile stress is accordingly terminated) is about 30 cps less than the 330 cps frequency at which that portion is being driven in vibration. Accordingly, in the sheet tensioning example represented by FIG. 3, the natural resonant frequency of sheet portion 62 while in machine 10 (and, also, the natural resonant frequency of the portion of a sheet 25 within ring 90 after that sheet and adhered ring have been removed from machine 10) is about 300 cps. The difference between the natural resonant frequency of sheet portion 62 and the frequency at which it is driven in vibration will be a function of the value of the switch point level 142 as a percentage of the peak amplitude 141, and that functional relationship can readily be determined by experiment.

The switch point level 142 is set below the peak amplitude 141 for the following reasons. First, for driving frequencies differing substantially from the 330 cps frequency shown in FIG. 3, the value of the peak amplitude may vary somewhat, and accordingly the switch point level could not be set to exactly match the peak amplitudes attained at all those various driving frequencies. Second, at the peak amplitude 141, the rate of change of the curve 135 is zero and, accordingly, any departure in the actual value of the switch point level from the nominal level to which it is set would be reflected in a larger error from calculated value in the natural resonant frequency of sheet portion 62 attained at the switch point than in the error occurring when the switch point level is set to be below the peak amplitude. Hence, it is preferable that the switch point level be set a value which is a high percentage (i.e. 80%) of the peak amplitude 141, and which causes such level 142 to intersect curve 135 at a steep part of its rise towards peak resonance as, for example, at about the lower frequency inflection point of the resonance "bell" portion of the curve.

Referring now to FIG. 4, that figure shows by "asterisks" (*) various correlations between the natural resonance frequency (vertical ordinate) of various electret sheet portions in which the tensile stress has been retained by hoops 90 and the natural resonant frequency of electret microphone diaphragms made from such sheet portions in the manner disclosed in the aforementioned Paulus et al application. The average of such correlations is represented by straight line 150.

The graphs of FIGS. 3 and 4 may be used together as follows. It has been found desirable, for good performance of electret microphones made in accordance with the Paulus et al application, that the diaphragms thereof have a natural resonant frequency of between about 6000 cps and 7000 cps. Assume that the value settled on for such frequency is 6300 cps. From that value shown in the horizontal ordinate of the FIG. 4 graph, a vertical line 151 is projected upwards to intersect line 150 at point 152. Then from point 152, a horizontal line 153 is projected leftward to intersect the vertical ordinate of the FIG. 4 graph to intersect it at a point 154 representing a natural resonant frequency for sheet portion 62 of 295 cps. That is, the FIG. 4 graph indicates that, if a natural resonant frequency of 6300 cps is desired for the diaphragms of electret microphones made from electret sheets tensioned by machine 10, then the machine should be operated to impart to the sheet portion 62 tensioned thereby a natural resonant frequency of 295 cps.

To arrive at such natural resonant frequency for such sheet portions, there is utilized the empirical relationship (determined by experiment on machine 10) that for any frequency within a range of such natural resonant frequencies between about 280 and about 300 cps, the curve of the magnitude of the voltage signal to device 120 as a function of increasing tensile stress in sheet 62 will have a shape and peak amplitude substantially similar to curve 135 in FIG. 3 and that, accordingly, if the switch point level is set to about 80% of peak amplitude or, more specifically, to 300 millivolts, the difference between the natural resonant frequency of the tensioned sheet portion 62 and the frequency of which such sheet portion is driven in vibration will be about 30 cps. Accordingly, all that is necessary in order to impart to a sheet portion 62 a natural resonant frequency of 295 cps is to set adjustable oscillator 115 to produce a sine wave output which is 30 cps higher in frequency or, in other words, has a frequency of 325 cps. Of course, the empirical relationship specified above may not be applicable with adequate accuracy for a natural resonant frequency other than the mentioned 280–300 cps range, but, in that case, the proper imperial relationship for such other range may readily arrived at by experimentation. In such connection, the natural resonant frequency of vibration of a tensioned sheet portion 62 may be determined by, after tensioning it by the operation of machine 10 as described above, to interrupt such operation directly after the advance of tension-producing ring 60 has been ended, and thereafter, to produce a sweep over an appropriate range of the frequency of the signal from oscillator 115 to speaker 70, measuring the frequency of such signal at various points in such sweep by a frequency meter (not shown), concurrently measuring, for each such point, the amplitude of vibration of sheet potion 62 with the use of voltmeter 120 (with its switch point being disabled) and from such measured data, determining the frequency in such sweep which produces the peak vibrating amplitude. That frequency will be, of course, the natural resonant frequency of the tensioned sheet portion 62.

Coming now to certain details of the exemplary apparatus and methods described herein, the electret sheets 25 treated by machine 10 are square sheets about 12" on a side. In the machine, "O" ring has a central diameter of $8\frac{3}{4}$", aperture 21 in slide table 20 has a diameter of $8\frac{1}{4}$", ring 60 has an outer diameter of 8", and the other parts of the machine are to scale in FIG. 1. In tensioning an electret sheet portion 26, ring 60 advances about 3/32" from the time it first makes contact with that sheet portion until the time its forward motion is terminated. An electret sheet 25 is constituted of a film of FEP TEFLON having a thickness of $\frac{1}{2}$ mil (i.e., 0.0005") and of a chromium layer on a surface of such film and having a thickness of 600 angstrom units.

The above described embodiments of apparatus and methods being exemplary only, it is to be understood that additions thereto, omissions therefrom and modifications thereof may be made without departing from the spirit of the inventions. Examples, without limitation, of the foregoing are as follows. The changing tension-producing force exerted on the electret need not be a monotonically increasing force and, if desired (although not preferred), the sheet may initially be overtensioned and then have the tensile stress therein reduced to a value at which the desired natural resonant frequency of the tensioned sheet portion is obtained. The vibratory energy imparted to the electret sheet to drive it in vibration may be produced by means other than a sound wave generator, and the frequency of such vibratory energy may vary consonant with terminating tensioning of the sheet at the appropriate time, although it is more convenient to have such frequency remain constant. The parameter of the vibration of the sheet which is monitored need not be amplitude but may, instead, be say, the change occurring between the phase of the vibration of the sheet and the phase of the vibratory energy inducing such sheet vibration as the tensile stress in the sheet changes. As earlier indicated, choice can be exercised in establishing the switch point level or oher criteria which determines when further tensioning of the sheet will be terminated. While the invention has been described in terms of its application to tensioning pieces of electret sheets used in the manufacture of electret microphone diaphragms, the invention also is deemed capable of application for other purposes and/or with other kinds of sheet materials to tension such materials or pieces thereof.

Accordingly, the invention is not to be considered as limited save as is consonant with the recitals of the following claims.

What is claimed is:

1. A method of treating a piece of sheet material comprising, applying to said piece a changing tension-producing force which develops in said piece a correspondingly changing tensile stress isotropic in the length and width dimensions of said piece, concurrently imparting to said piece a vibration independent in frequency of said stress and having a parameter which varies as a function of said changing stress, sensing said vibration so as to monitor said parameter, determining from said monitoring when said changing stress causes said variable parameter to reach a preselected value therefor, and thereupon terminating further change in said force while continuing its application so as to retain in said piece the then existing tensile stress therein.

2. A method according to claim 1 in which said vibration is imparted to said piece by exposing it to sound waves impinging on a surface thereof.

3. A method according to claim 2 in which said sound waves are constant in frequency.

4. A method according to claim 2 which said sound waves are constant in amplitude.

5. A method according to claim 1 in which said parameter of said vibration is the amplitude thereof.

6. A method according to claim 1 in which said vibration is caused by said changing force to vary from a condition of non-resonant vibration of said piece to a condition of resonant vibration thereof, and in which said terminating of further change in said force is effected upon said vibration arriving at said resonant condition.

7. A method according to claim 1 in which said material is electret sheet material.

8. A method according to claim 1 in which said force radially tensions said piece to develop said tensile stress therein.

9. A method according to claim 1 in which said vibration is and remains substantially constant in frequency during the applying to said piece of said changing force.

10. A method according to claim 1 further comprising the steps performed after said terminating step of (a) bonding to a surface of said piece a rigid tension-retaining ring so that such ring surrounds and is surrounded by, respectively, a central portion of said piece and a fringe portion thereof, and so that said ring fixedly retains in said central portion the tensile stress existing in said piece after said terminating step while said force continues to be applied, and (b) subsequently discontinuing application of said force.

11. A method according to claim 1 in which said force changes by progressively increasing from an initial value therefor of zero, and in which said increasing force causes said vibration parameter to vary from initial value characterizing non-resonant vibration of said piece to a subsequent value characterizing resonant vibration thereof.

12. A method of treating a piece of sheet material comprising, driving said piece by constant frequency vibratory energy so as to impart to said piece a vibration of the same frequency as that of said energy, applying to said piece a changing tension-producing force developing therein a tensile stress isotropic in the length and width dimensions of said piece, said changing force causing said vibration to change from a condition of non-resonant vibration of said piece to a condition of resonant vibration thereof, sensing said vibration to determine arrival thereof at said resonant condition, and thereupon terminating further change in said force while continuing its application so as to retain in said piece the then existing tensile stress therein.

13. The method of treating an electret sheet comprising, holding said sheet around the circumferential margin of a first portion thereof surrounded by sheet material so as by such holding to preclude radially inward slippage at such margin of such material, contacting said sheet within said first portion by tension-producing means making with said sheet a ring shaped area of contact surrounding a second sheet portion included within said first portion, imparting to said second sheet portion a vibration, advancing said tensioning means against said sheet to produce a progressively increasing radial tensioning of said second sheet portion, sensing during said tensioning the vibration of said second sheet portion, deriving from said sensing a signal which is a function of a parameter of such vibration, and terminating said advancing of said tensioning means upon said signal reaching a selected value so as to arrest said tensioning of said second sheet portion at the value it has then attained.

14. The method according to claim 13 in which said holding is effected by positioning said sheet on support means so that said first portion of said sheet registers with a recess in said support means, and sheet material around said first portion registers with a bearing surface provided by such support means and ringing said recess, and advancing a ring shaped clamping means towards such bearing surface to squeeze such material between said clamp means and bearing surface to thereby grip such sheet around said first portion.

15. Apparatus for tensioning part of a sheet of material comprising, means for holding material of said sheet surrounding the circumferential margin of a first portion thereof so as by such holding, to preclude radially inward slippage at such margin of such surrounding material, a tension-producing ring adapted to contact a ring shaped area of said sheet disposed within said first portion and surrounding a second portion of said sheet, movable pressing means adapted by movement thereof to press said ring against said area with a changing force so as to develop in said second sheet portion a correspondingly changing radial tensile stress, means to concurrently impart to said second sheet portion a vibration having a parameter which varies as a function of said changing stress, means responsive to said vibration to monitor said varying parameter so as to permit determination of when said changing stress causes said variable parameter to reach a preselected value therefor, and means adapted upon said parameter reaching such value to terminate further change in said force while continuing said pressing of said ring against said area so as to retain in said second portion the tensile stress then existing therein.

16. Apparatus according to claim 15 in which said holding means comprises, sheet support means having a bearing surface ringing a recess formed in said support means, said sheet being positionable on said support means so that a first sheet portion registers with said recess and sheet material around such portion registers with such surface, and ring-shaped clamping means movable towards said surface to squeeze said such material between such means and said surface to thereby grip such sheet around said first portion.

17. Apparatus according to claim 16 in which said recess is provided by an aperture formed in said support means, and in which said apparatus further comprises, movable ring transporting means adapted to carry at its front a tension-retaining ring having adhesive thereon, said transporting means being adapted after said termination of further change in said force to move such ring within said aperture towards and then against said sheet so as produce between such ring and a corresponding ring shaped area of said sheet within said second portion a bonding by said adhesive of said ring and sheet, which bonding fixedly retains in a third portion of said sheet ringed by such area the tensile stress existing in said third portion as of the time of such termination.

18. Apparatus according to claim 15 in which said vibration imparting means comprises electroacoustic transducer means adapted in response to excitation thereof by alternating electrical energy to generate sound waves constant in amplitude and frequency and to direct said waves onto said second sheet portion to thereby impart said vibration thereto.

19. Apparatus according to claim 15 in which said vibration monitoring means comprises vibration sensing means adapted to be optically coupled with said second sheet portion by a light beam which is intensity modulated by said vibration, and optolectronic means responsive to said modulated light beam to electrically indicat the amplitude of said vibration.

20. Apparatus according to claim 15 further comprising control means responsive to an indicating by said monitoring means of a reaching by said vibration parameter of said preselected value to stop the movement of said pressing means so as to thereby effect said termination of further change in said force.

21. Apparatus for tensioning part of a sheet of material comprising, sheet support means having a bearing surface ringing a recess formed in said means, said sheet being positionable on said support means so that a first sheet portion registers with said recess and sheet material around said portion registers with said surface, ring-shaped clamping means movable towards said surface to squeeze said material between it and said surface to thereby grip said sheet around said first portion thereof, a tension-producing ring adapted to contact a ring shaped area of said sheet disposed within said first portion and surrounding a second portion of said sheet, movable pressing means adapted by movement thereof towards said support means to press said ring against said area with increasing force so as develop in said second portion an increasing radial tensile stress, means operable during such tensioning of said second portion to impart thereto a constant frequency vibration of which the amplitude is caused by said increasing stress to increase, vibration monitoring means responsive to said vibration to produce a running indication of the value of the amplitude thereof as said amplitude increases, and control means responsive to the reaching by said amplitude of a preselected value for stopping the movement of said pressing means to terminate further increase in said force while continuing said pressing by said ring of said second portion so as, thereby, to retain the tensile stress then existing therein.

* * * * *